UNITED STATES PATENT OFFICE.

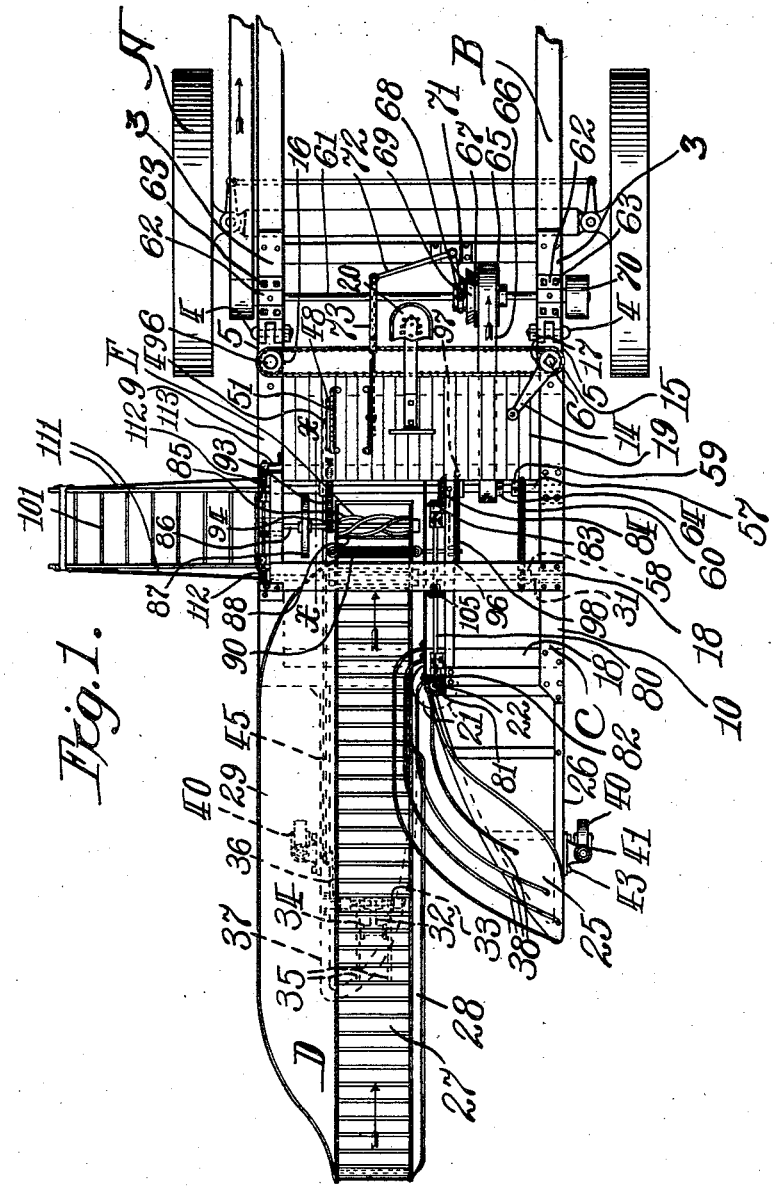

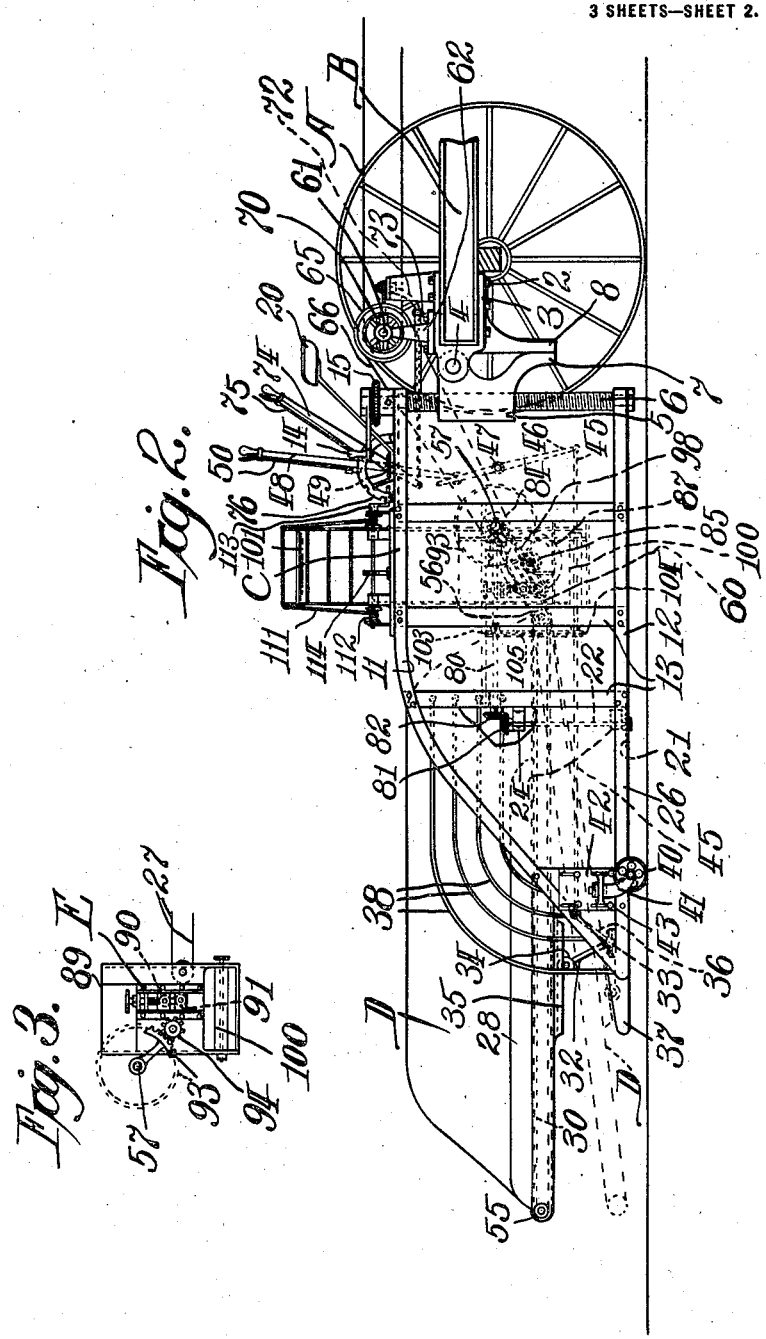

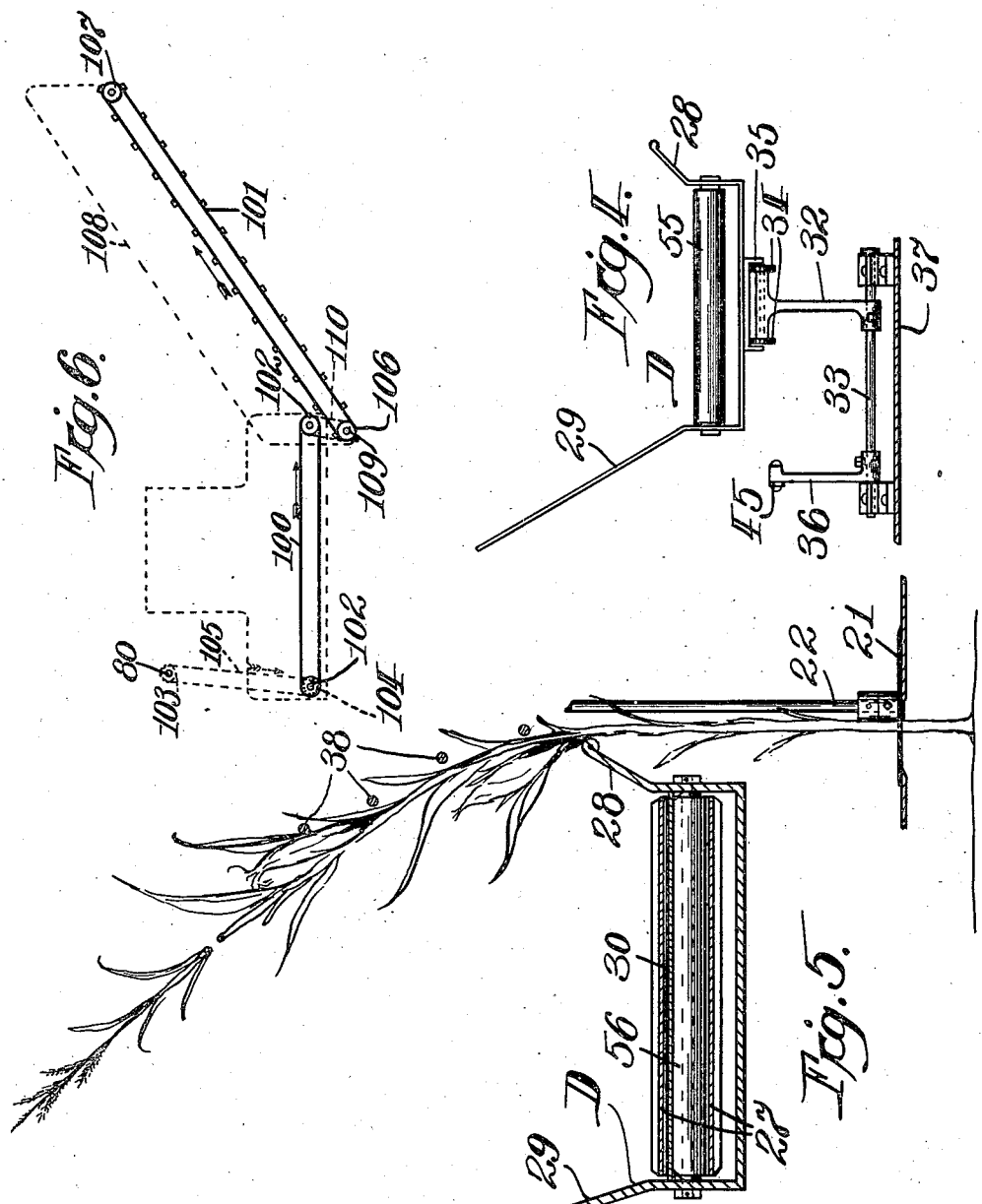

DANIEL MEYER, OF MORRIS, MINNESOTA.

MACHINE FOR HARVESTING AND REDUCING CORN OR OTHER GROWTH TO SILAGE.

1,138,304.

Specification of Letters Patent.

Patented May 4, 1915.

Application filed June 28, 1913. Serial No. 776,401.

*To all whom it may concern:*

Be it known that I, DANIEL MEYER, a citizen of the United States, residing at Morris, in the county of Stevens and State of Minnesota, have invented a new and useful Improvement in Machines for Harvesting and Reducing Corn or Other Growth to Silage, of which the following is a specification.

The object of this invention is to provide an improvement in machines for harvesting and reducing corn and other growth to silage, in which the corn stalks or other growth are conducted into the silage reducing mechanism butt first. This particular improvement is designed to accomplish this result in an efficient and economical manner, whereby a minimum of power is required for operating the machine. The improvement also provides adjusting features whereby the mechanism is adapted to cut standing corn and other growth at any desired height from the ground and under varying conditions both as to the character and unevenness of the ground and to the character of the growth which is cut. The improvement also provides improved mechanism for accomplishing the above results which can be easily attached to or detached from a vehicle such as a tractor without having to incorporate the mechanism permanently into the vehicle structure. The improvement therefore enables the use of a tractor for general farm utility purposes which may be coupled with my improved mechanism at will.

In the accompanying drawings forming part of this specification, Figure 1 is a plan of my invention shown attached to a detail of a vehicle; Fig. 2 is a side elevation of the construction illustrated in Fig. 1; Fig. 3 is a section taken on the line X—X of Fig. 1; Fig. 4 is a detail looking at the forward end of the conveyer trough illustrating the means by which said forward end may be adjusted in height on the supporting frame; Fig. 5 is an enlarged diagrammatic view partly in section illustrating by diagram the manner in which the corn stalks are cut and tipped over into the trough on the conveyer with their butts first toward the silage cutter, and Fig. 6 is a diagrammatic view illustrating in elevation the transverse conveyers or carriers for conducting the silage away from the silage reducing mechanism. In the following description and claims, where I use the term "corn" it is intended that it be construed as including any vegetable growth adapted to make silage as its full equivalent.

This invention is adapted to be detachably mounted upon a vehicle either of the self propelled type such as a tractor or one drawn by horses, although it will be obvious that the essential elements of the broad idea involved may be easily constructed as an integral part of either of these types of vehicles. For illustration A indicates in the drawings a detail of a vehicle of either of the types mentioned, upon the forward end of the body frame B of which is detachably mounted by the bolts 2, a pair of channel members 3 disposed on either side of said body frame. Each of these channel members has attached thereto by means of the pivot bolt 4, a hinged supporting member 5. Through each of these supporting members a vertically disposed screw 6 is threaded, said supporting member and channel member being provided with depending stop lugs 7 and 8 which limit the downward swinging movement of the supporting member when the screw which it carries stands in vertical position. The supporting members are free to swing upward with their stop lugs 7 and 8 separated for the purposes to be hereinafter described. The screws 6 carry a forwardly extending frame C, having sides 9 and 10 formed by upper and lower bars 11 and 12 which are joined by vertical cross pieces 13. The rear end of the upper and lower bars 11 and 12 on each side are freely swiveled to the screws 6 whereby said frame C is supported and the screws are free to be turned in the supports 5 to vary the elevation of the frame C above the ground. To operate the screws a handle 14 is mounted on one member to turn it and the motion thus imparted is communicated to the other member simultaneously by means of the chain belt 15 passing over the sprockets 16 and 17 mounted upon said screws. The two sides 9 and 10 of the frame C are connected by means of transverse beams 18 and a platform 19 is mounted upon the top of said frame C which in turn carries a seat 20 for the operator of the machine.

The corn harvesting and silage reducing mechanism are adapted to be carried by the frame C and the mechanism by which the stalks of corn are conveyed with the butts of the stalks first into the silage reducing mechanism and the carrier by which the silage is conducted from the silage reducing mechanism are also mounted upon said frame so that the entire apparatus may by disconnecting the pivot bolts 4 or disconnecting the bolts 2 be removed from the vehicle and the vehicle used for other purposes than the operation of my invention.

The corn harvesting mechanism has a disk cutting blade 21 mounted upon a vertical shaft 22 which is suitably journaled in the frame C in the journal boxes 24, said disk cutter being adapted to revolve in a substantially horizontal plane. Immediately adjacent said cutter and extending forwardly and outwardly is a mold board 25 which is mounted upon an extension 26 of the frame C and is adapted to form a side of a throat into which the corn stalks are gathered and brought into contact with the disk cutter as the machine advances. Immediately adjacent the disk cutter and extending forwardly on the frame C in extension thereof and placed opposite the mold board is a longitudinal trough D which forms the opposite side of the throat into which the corn stalks are gathered in advance of cutting. This trough has a horizontal floor 30 connected to the sides 28 and 29 around which a conveyer belt 27 is adapted to travel with its upper lap moving backward toward the silage reducing mechanism E, and at one side of the disk cutter. The side 28 adjacent the disk cutter edge of the conveyer belt is low and the side 29 at the opposite edge of the conveyer belt is high, and said sides are adapted to act as guards for the corn stalk. The conveyer belt or trough frame 30, has its rear end pivoted upon the shaft 31 which is journaled in the frame C and its forward end supported in adjusted elevation by the lever arm 32, the operating end of which is mounted upon a shaft 33 journaled upon an extension portion 37 of the frame C and the free end provided with antifriction rollers 34 which are adapted to run in a longitudinal guide channel 35, said channel being secured to the lower portion of the conveyer frame 30. By turning the shaft 33 through the use of an arm 36 the lever 32 may be tilted to vary the height at which the forward end of the longitudinal conveyer is supported upon the frame C.

Immediately adjacent the mold board 25 is a mold frame composed of a plurality of arms 38 which extend upwardly from the lower and forward portion of the mold board and rearwardly above and back of the disk cutter where their ends are secured to a portion of the frame C, said arms being curved in suitable lines whereby as the machine advances the corn stalks are gradually tilted from upright position with their upper ends down over the low side 28 of the conveyer D causing their butt ends when cut to tilt up and onto the conveyer belt, their butt ends being carried rearwardly by said belt in advance into the silage reducing mechanism E, the upper lap of said belt being caused to travel in the direction of the arrows indicated in Fig. 1. The forward extensions 26 and 37 of the frame C are supported upon carrier wheels 40 which are adapted to roll over the ground and are mounted in supports 41, which in turn are swiveled upon supporting plates 42. These supporting plates are secured to the sides of the extensions by means of bolts 43 passing through slots into the frames whereby said plates may be selectively positioned in height on the frames to vary the height at which the forward portion of the frame C is adapted to be carried, the stop lugs 7 and 8 assisting in limiting the lowermost position at which the forward ends of said frame are permitted to travel. This limitation of movement of the forward end of the frame C prevents the apparatus from catching in the ground in case it runs over an abrupt depression which otherwise would wreck the machine.

The means for tilting the arm 36 and thus raising or lowering the forward end of the conveyer trough consists of a rod 45 connected by one end to the free end of the arm 36 and by its other end to one end of the tilting lever 46, said lever being pivoted at 47, between its ends on the frame C and slidably connected by its other end to the operating end of a hand lever 48, the latter being pivoted between its ends at 49 on the frame C and provided with lock bolt 50 which coöperates with a quadrant 51 to hold the lever 48 in adjusted position. Thus by tilting the lever 48 the forward end of the trough may be adjusted in height above the ground to catch the corn stalks. This adjustment in height enables the conveyer to catch the corn stalks whether short or long.

The means for operating the conveyer belt 27 in the trough consists of rollers or pulleys 55 and 56, the former being freely journaled in the trough frame 30 and the latter securely mounted upon the shaft 31 which is journaled upon the frame C and revolubly connected to a drive shaft 57, the latter being also journaled upon the frame C. The means of connection between said shafts consists of sprockets 58 and 59 and a sprocket chain 60. The drive shaft 57 is adapted to be revolved by a main shaft 61 journaled upon stands 62 which are mounted upon the channel members 3 by means of the bolts 63, the mode of connecting said shafts 57 and 61 being by means of pulleys 64 and 65 and a belt 66, said pulley 64 being mounted upon the shaft 57 and the pulley 65 carried by the driven member 67 of a clutch 68, said clutch having its shiftable driving member 69 mounted upon and carried by the shaft 61. The drive shaft 61 is adapted to be revolubly connected with any suitable source of power such as the prime mover carried by the self propelled vehicle not shown, on which the invention is detachably mounted, a pulley 70 being illustrated mounted upon the shaft 61 around which a drive belt extending from said prime mover may be passed. The shaft 57 may be thrown into or out of operation by shifting the drive member 69 of the clutch 68 through the use of operating levers and connecting arms 71, 72, 73 and 74, the arm 74 being provided with a lock bolt 75, which is adapted to coöperate with the quadrant 76 to hold the lever arm 74 and its connected drive member of the clutch in or out of connection with the driven member of said clutch.

The disk cutter shaft 22 of the corn harvesting mechanism is revolubly connected with the drive shaft 57 by means of the counter shaft 80, which is journaled in the frame C of the machine and pairs of intermeshing bevel gears 81 and 82 and 83 and 84, the proportions of said gears being such as to revolve the disk cutter at suitable speed according to the speed of operation of the drive shaft 57. The silage cutting mechanism consists of a cylindrical cutter 85 mounted upon a shaft 86 which is suitably journaled in the frame C and carries a fly wheel 87. The blades of the cutter coöperate with a stationary blade 88 to cut the corn stalks and a suitable hopper 89 is constructed around the cylinder and stationary cutter which assists in directing the corn stalks into engagement with the cutting mechanism. Immediately in front of the cutting mechanism described are two coöperating feed rollers 90 and 91, these rollers being of ordinary construction and adapted to spread apart under spring tension to suitably engage and feed the corn stalks into the cutting mechanism. These feed rollers are suitably journaled in the frame C, the roller 90 being idle and the roller 91 being driven as will be hereinafter described.

The feed rollers are positioned immediately adjacent the delivery end of the carrier belt or apron 27 and between said belt and silage cutting mechanism E. The cutting cylinder 85 is revolved at suitable speed by means of the gear 93 mounted upon the shaft 57 and the pinion 94 mounted upon the cylinder shaft 86. The feed roller 91 is revolved at suitable speed by sprockets 96 and 97, respectively mounted upon the shaft carrying the feed roller 91 and the drive shaft 57, and by means of the chain 98 passing around said sprockets.

For the purpose of delivering the silage at one side of the apparatus a pair of conveyer belts or aprons 100 and 101 are provided, the former being placed below the cutting mechanism E and adapted to catch the cut silage and deposit the same upon the elevating belt 101. Belt 100 is suitably carried by rollers 102 in the frame C, receiving power from the shaft 80 by means of drive pulleys 103 and 104 and the belt 105. The elevating belt 101 is carried by rollers 106 and 107 journaled in a carrier frame 108, which is pivoted on the shaft 109, carrying the pulley 106 in the frame C whereby the carrier 101 in its frame may be adjusted in height on its outer end. Power is communicated to the elevating belt 101, by means of the belt 110 passing around the pulleys 102 and 106. The outer free end of the elevating carrier frame is supported in adjusted elevation by means of cables 111, passing around hand operated winches 112 of usual construction, said winches being adapted to be operated by the hand lever 113, and locked in stationary adjusted position by a dog and ratchet wheel of the usual type 114 (see Fig. 2). The operating levers 48, 74 and 113 are conveniently located within easy reach of the operator on the seat 20.

In use my improved apparatus may be easily and quickly attached to a vehicle by inserting the bolts 2 through the channel supports 3 or after the channel supports have been attached by inserting the bolts 4 through the channel members and the supports 5. The various adjustments described may then be made to facilitate the operation of the machine according to the height at which the corn is to be cut and the condition of the ground over which the machine is to be used. As the machine advances that portion of the structure between the forwardly extending trough and the mold board is directed in line with a row of standing corn. The corn thus engaged by the mold frame as the machine advances is cut by the disk cutter and the stalks of cut corn are turned over by the mold frame and laid down into the trough on the conveyer belt with the butt ends in position to advance into the silage cutting mechanism between the feed rollers. The lateral guards or sides 28 and 29 suffice to prevent the corn from rolling off of the conveyer and hold the stalks in longitudinal position. As the corn is reduced to silage, the silage is caught by the conveyer 100, and deposited upon the elevator 101 which in turn is adapted to deliver it from the machine into any vehicle or upon the ground as desired.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A machine of the character set forth, comprising, in combination, a vehicle, a frame detachably mounted upon said vehicle in extension thereof, a longitudinal trough on said frame, a carrier in said trough, a silage cutter disposed at the rearward end of said trough to which said conveyer is adapted to feed the stalks of corn, a corn stalk harvesting cutter at one side of said trough, a mold frame forwardly adjacent said cutter adapted during the forward movement of the machine to tip the corn stalks as cut over into said trough and onto said carrier with their butt ends toward said silage cutter and means for actuating said carrier and stalk and silage cutters, for the purposes specified.

2. A machine of the class set forth, comprising, in combination with a vehicle body, a supporting frame hinged upon said body to swing up, means for adjusting the height at which said frame is supported above the ground, carrying wheel elements adapted to support the outer free end of said frame on the ground, a corn harvesting cutter journaled on said frame, a silage reducing cutter on said frame, means for turning the cut corn from standing into substantially horizontal position with their butt ends facing said silage reducing cutter, and means for conducting said corn while in horizontal position butt first into engagement with said silage reducing cutter.

3. A machine of the class set forth, comprising, in combination with a vehicle body, a supporting frame hinged upon said body to swing up, stops interposed between said frame and body adapted to limit the downward swinging movement of said frame, means for adjusting the height at which said frame is supported above the ground, carrying wheel elements adapted to support the outer free end of said frame on the ground, a corn harvesting cutter journaled on said frame, a silage reducing cutter on said frame, means for turning the cut corn from standing into substantially horizontal position with their butt ends facing said silage reducing cutter, and means for conducting said corn while in horizontal position butt first into engagement with said silage reducing cutter.

4. A machine of the class set forth, comprising, in combination with a vehicle body, a supporting frame hinged upon said body to swing up, carrying elements selectively positioned to vary the height at which the forward free end of said frame is adapted to be supported on the ground, a corn cutter carried by said frame adapted to harvest standing corn, a silage cutter back of said corn cutter and a substantially horizontal conveyer extending forward on said frame at one side of said corn cutter and backward to said silage cutter, said conveyer being hinged upon said frame to swing up, means for adjustably supporting the free end of said conveyer to vary its height on said frame, and a mold frame coacting with said corn cutter and conveyer to tip the standing corn as cut into horizontal position on said conveyer with the butt ends of the corn stalks in position to advance toward said silage cutter.

5. A machine of the class set forth, comprising, in combination, a supporting frame, a harvesting cutter journaled in said frame, a silage cutter also journaled in said frame, a longitudinal conveyer frame pivoted on said supporting frame having its forward end adapted to swing up, said conveyer frame being disposed at one side of said corn cutter and extending rearwardly to said silage cutter, means for adjustably supporting the free end of said conveyer frame on said supporting frame, a horizontal conveyer belt in the bottom of said trough, a mold frame adapted to tilt standing corn as cut over into horizontal position on said belt with the butt ends of the corn stalks facing said silage cutter, guards at the sides of said trough, a transverse conveyer below said silage cutter adapted to deliver the silage away from said machine and means for actuating said corn and silage cutters and conveyers.

In testimony whereof, I have signed my name to this specification, in the presence of two subscribing witnesses.

DANIEL MEYER.

Witnesses:
S. A. SIVERTS,
R. S. CLARK.